United States Patent
Krasner et al.

(10) Patent No.: US 11,003,539 B2
(45) Date of Patent: May 11, 2021

(54) OFFLOAD PROCESSING USING A STORAGE SLOT

(71) Applicant: EMC IP Holding Company LLC, Hopkinton, MA (US)

(72) Inventors: Jon I. Krasner, Coventry, RI (US); Jonathan P. Sprague, West Boylston, MA (US); Jason J. Duquette, Milford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 171 days.

(21) Appl. No.: 16/247,770

(22) Filed: Jan. 15, 2019

(65) Prior Publication Data

US 2020/0226027 A1 Jul. 16, 2020

(51) Int. Cl.
 *G06F 11/00* (2006.01)
 *G06F 11/14* (2006.01)
 *G06F 9/38* (2018.01)
 *G06F 9/50* (2006.01)

(52) U.S. Cl.
 CPC ........ *G06F 11/1423* (2013.01); *G06F 9/3877* (2013.01); *G06F 9/5027* (2013.01); *G06F 11/1428* (2013.01)

(58) Field of Classification Search
 CPC ............. G06F 11/1423; G06F 11/1428; G06F 11/0724; G06F 9/3877; G06F 9/5027; G06F 9/505
 See application file for complete search history.

(56) References Cited

U.S. PATENT DOCUMENTS

| 7,363,417 | B1* | 4/2008 | Ngai ................... G06F 13/4022 710/305 |
| 9,208,168 | B2 | 12/2015 | Knight et al. |
| 9,519,441 | B1 | 12/2016 | Smith et al. |
| 10,678,778 | B1 | 6/2020 | Chalmer et al. |
| 2003/0158906 | A1 | 8/2003 | Hayes |
| 2003/0159076 | A1 | 8/2003 | Delisle et al. |

(Continued)

OTHER PUBLICATIONS

Jon I. Krasner, et al., "Offload Processing Using Storage Device Slots," U.S. Appl. No. 16/050,868, filed Jul. 31, 2018.

(Continued)

*Primary Examiner* — Christopher S McCarthy
(74) *Attorney, Agent, or Firm* — Muirhead and Saturnelli, LLC

(57) ABSTRACT

Offload processing may be provided that is not dedicated to a primary processor or a subset of primary processors. A system may have one or more offload processing devices, including one or more APUs, coupled to data storage slots of the system, which can be shared by multiple primary processors of the system. Each offload processing device may be configured to be coupled to a storage slot, for example, as if the device were a storage drive, and include an interface in conformance with a version of an NVMe specification and may have a form factor in accordance with the U.2 specification. The APU within each offload processing device may be communicatively coupled to one or more primary processors by switching fabric disposed between the one or more primary processors and the storage slot to which the offload processing device is connected.

14 Claims, 4 Drawing Sheets

(56) References Cited

U.S. PATENT DOCUMENTS

| | | | |
|---|---|---|---|
| 2010/0045682 A1* | 2/2010 | Ford | G06F 9/30181 |
| | | | 345/502 |
| 2014/0201761 A1* | 7/2014 | Dalal | G06F 12/0815 |
| | | | 718/108 |
| 2018/0091361 A1* | 3/2018 | Smith | H04L 67/16 |
| 2018/0267836 A1* | 9/2018 | Olarig | G06F 9/5027 |
| 2018/0321876 A1 | 11/2018 | Ballapuram et al. | |
| 2019/0109793 A1 | 4/2019 | Dalal | |
| 2019/0129882 A1* | 5/2019 | Pudipeddi | G06F 1/185 |

OTHER PUBLICATIONS

Steven Chalmer, et al., "Data Deduplication Acceleration," U.S. Appl. No. 15/787,930, filed Oct. 19, 2017.

\* cited by examiner

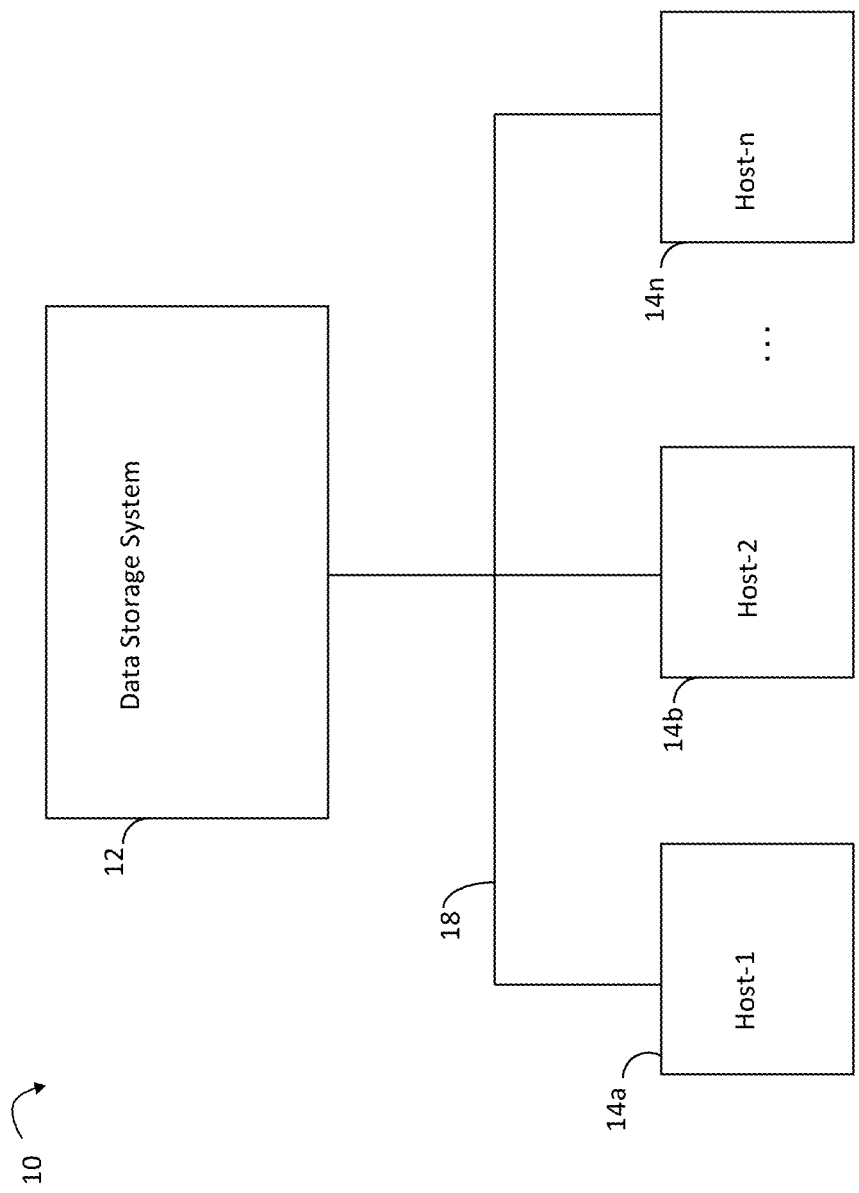

OFFLOAD PROCESSING USING A STORAGE SLOT

BACKGROUND

Technical Field

This application generally relates to computer processing and, in particular, offloading processing using data storage device slots.

Description of Related Art

Data storage systems may include resources used by one or more host systems. Data storage systems and host systems may be interconnected by one or more communication connections such as in a network. These resources may include, for example, data storage devices such as those included in the data storage systems manufactured by Dell EMC. These data storage systems may be coupled to one or more host systems, where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system. Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may initiate performance of read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems also may be used.

SUMMARY OF THE INVENTION

In some embodiments, a system is provided including one or more primary processors, one or more storage slots arranged to receive storage drives, a switch fabric communicatively coupling the one or more storage slots to the one or more primary processors to perform I/O operations between the one or more primary processors and one or more storage drives installed in the one or more storage slots, and a processing device including an accelerated processing unit (APU), the processing device disposed with the one or more storage slots, the APU communicatively coupled to the one or more primary processors. The APU may include: at least one central processing unit; at least one graphical processing unit; and logic to determine utilization of the at least one central processing unit and/or the at least one graphical processing unit based at least in part on a processing task to be performed. The one or more primary processors may include a plurality of primary processors communicatively coupled to the APU. The processing device may have a form factor in conformance with a U.2 specification, and the processing device may have an interface that interfaces the APU with the switch fabric in accordance with an NVMe specification. The system may include a memory including code stored thereon that, when executed, performs a method including a first primary processor of the one or more primary processors sending first data and one or more first instructions over the switch fabric to the APU, and the APU executing the one or more first instructions on the first data. The method may further include a second primary processor of the one or more primary processors sending second data and one or more second instructions over the switch fabric to the APU, and the APU executing the one or more second instructions on the second data. The one or more first instructions may define an application, and the APU may execute the application to produce results without assistance from the first primary processor and communicate the results to the first primary processor, and during execution of the one or more first instructions, the first primary processor may fail, and the APU continues executing the one or more first instructions during the failure of the first primary processor. The system may be a data storage system including one or more directors that include the one or more primary processors and one or more back-end adapters communicatively coupling the one or more directors to the APU across the switch fabric.

In another embodiment, for a system including a plurality of primary processors, an APU serving as an offload processor physically coupled to the system by a non-volatile storage slot of the system, and a switch fabric communicatively coupling the non-volatile storage slot to each of the plurality of primary processors, a method is performed including a first processor of the plurality of primary processors sending first data and one or more first instructions over the switch fabric to the APU, and the APU executing the one or more first instructions on the first data. A second processor of the plurality of primary processors may send second data and one or more second instructions over the switch fabric to the APU, and the APU may execute the one or more second instructions on the second data. The one or more first instructions may define an application, and the APU may execute the application to produce results without assistance from the first primary processor and communicate the results to the first primary processor. During execution of the one or more first instructions, the first processor may fail, and the APU may continue executing the one or more first instructions during the failure of the first processor.

In another embodiment, one or more computer-readable media, for example, non-transitory computer-readable media, are provided for a system including a storage system and at least one host system having a plurality of instances of applications executing thereon. The computer-readable media has software stored thereon including executable code that performs one or more of the above-described methods.

In another embodiment, a device for performing offload processing includes one or more APUs, a connection interface that couples the device to a switching fabric, and a form factor that couples the device to a storage slot of another device. The connection interface may couple the device to a switching device as if the device were a storage drive, and the connection interface may couple the device to a switching fabric in conformance with an NVMe specification. The form factor of the device may couple the device to a storage slot of another device as if the device were a storage drive, and the form factor may couple the device to a storage slot of another device in conformance with a U.2 specification.

BRIEF DESCRIPTION OF THE DRAWINGS

Features and advantages of the present invention will become more apparent from the following detailed description of illustrative embodiments thereof taken in conjunction with the accompanying drawings in which:

FIG. 1 is a block diagram illustrating an example of a system according to embodiments of the invention;

DETAILED DESCRIPTION OF EMBODIMENTS

Figure 2A:
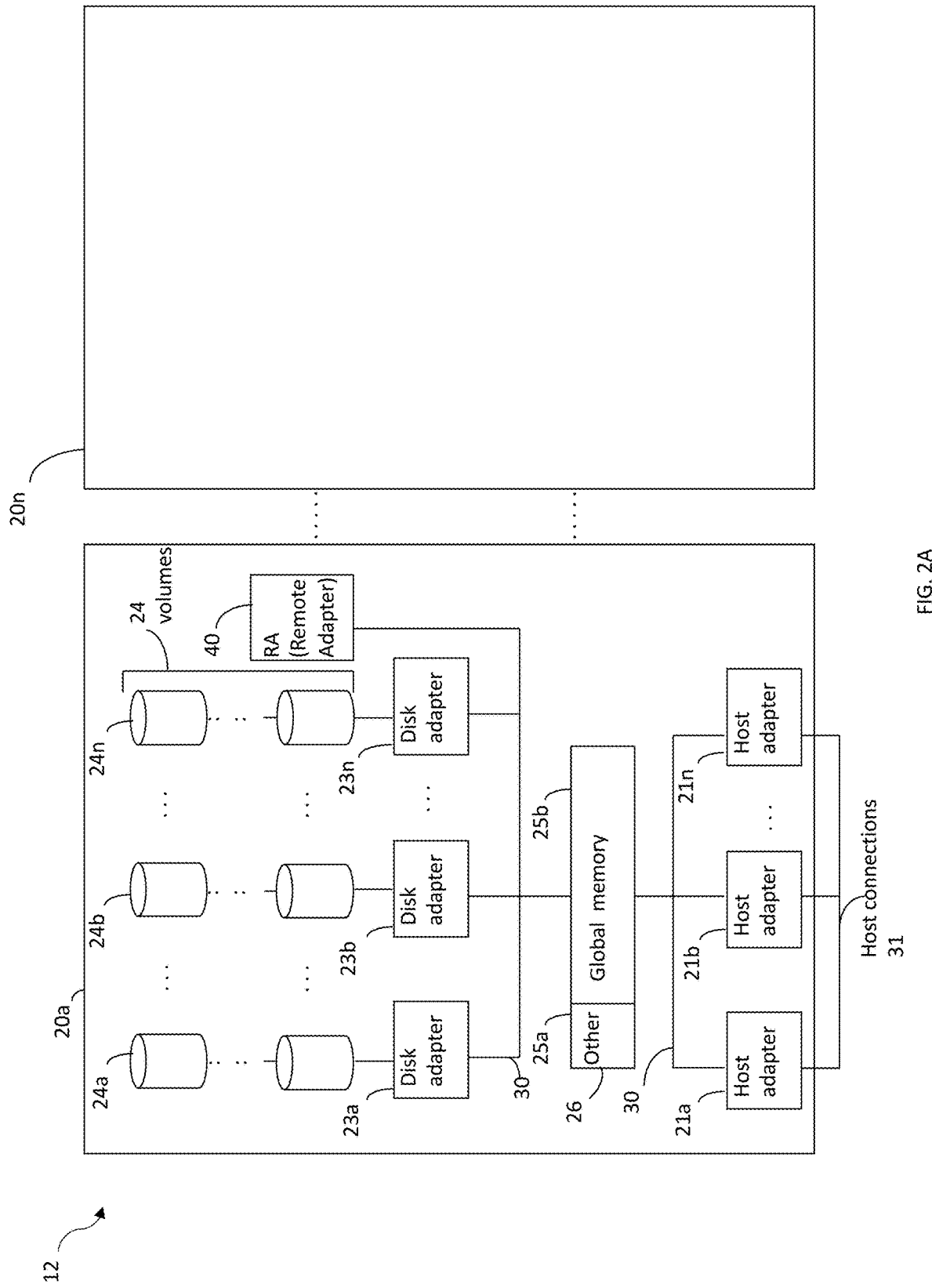
FIG. 2A is a block diagram illustrating an example of a data storage system according to embodiments of the invention.

For some applications, or tasks thereof, it may be desirable to offload at least some of the required processing from a primary CPU core to one or more other processors or other logical components, for example, one or more APUs, graphical processing units (GPUs), CPU clusters, field programmable gate arrays (FPGAs), application-specific integrated circuits (ASICs) and/or System-on-chip (SoC) components, thereby freeing up core CPU resources for other processing. For example, on a storage system, it may desirable to have the CPU core of a director (or the like) dedicate as much of its computational resources as possible to processing I/O streams, rather than apportioning its computational resources between I/O processing and other tasks such as, for example, processing related to managing and provisioning storage, storage tier promotion and demotion, machine learning, I/O prediction or forecasting, and other tasks. It may be desirable to offload computationally complex processing in particular to an APU or GPU. An APU is a discrete hardware component (e.g., a chip or the like) including at least: one or more CPUs; and one or more GPUs. As the APU includes at least one CPU and at least one GPU, the APU may perform heterogenous computing—i.e., computing involving concurrent use of both CPU and GPU resources.

One offload processing option is to directly couple one or more offload processors (e.g., APUs, GPUs or other types of processors) to a director, such that the one or more offload processors are dedicated to the directly coupled director such that the director has exclusive use of the offload processor. For example, in a storage system in which PCIe is employed, an APU or GPU embodied on a PCI card may be directly coupled to a director and its local dedicated memory, e.g., via a root complex. Similarly, on a server, an APU or GPU PCI card may be directly coupled and dedicated to a processor and its dedicated memory. On some storage systems, for example, storage systems made available from Dell EMC, an offload processor may be directly coupled and dedicated to a director via a SLIC. As used herein, a "primary processor" may refer to any type of processor of a device (e.g., a server, storage system, or other device) configured to provide primary control and processing for the device, for example, a director of a storage system, a micro-processing core of a server, or a microcontroller of another type of device, and may also refer to a CPU or cluster of CPUs found in any of these components. As used herein, an offload processor may be any type of processor to which a primary processor or other component within a device offloads processing. Offload processors may include, but are not limited to, APUs, GPUs and CPUs.

Directly coupling and dedicating offload processors to a primary processor (e.g., a director) of a storage system or server has potential drawbacks. For example, if there are multiple primary processors on the storage system or server, dedicating an offload processor to just one of them offers limited flexibility between the multiple primary processors. That is, if a particular primary processor has reached its compute capacity, or the capacity of its own compute resources and that of its own dedicated one or more offload processors, there is no way to allocate to it compute resources dedicated to another primary processor. Also, when an offload processor is directly coupled to a primary processor, it may be made completely unavailable if the primary processor fails; i.e., it may be in the fault zone of the processor. Thus, even though other primary processors are still online and could use more compute resources, the compute resources of the offload processor are unavailable. Further, the primary processor may be involved in whatever processing is being performed by the offload processor, i.e., both processors may be working together on a task, and thus the primary processor might be using some of its own resources and exchanging communications with the offload processor. In such scenarios, the primary processor may be configured to give higher priority to processing I/O (e.g., read and write) requests than to the shared tasks(s), such that when the I/O request stream gets busy, less compute resources are allocated to the shared task, which may result in underutilization of the offload processor and slower execution of the task.

It may be desirable to have a storage system or server having multiple primary processors and offload processing capabilities that are not dedicated to just one of, or less than all of, the primary processors.

Described herein is a system for providing offload processing that is not dedicated to a primary processor or a subset of processors. In some embodiments, a system has an APU coupled to data storage device slots (hereinafter "storage device slots" or "storage slots") of the system, which can be shared by multiple primary processors of the system. A storage slot is a physical component of a storage system, server or other device configured to physically receive a storage drive, which physically couples the storage drive to the device, thereby enabling the device to utilize the storage drive. A storage drive (which also may be referred to herein as a "storage device" or "physical storage device") is a physical device that includes non-volatile memory and that is configured to be received by a storage slot of another device. Storage drives include, for example, solid-state devices (SSDs), e.g., flash, or disk drives like SAS, SATA or NVMe devices. The one or more offload processors (e.g., APUs) may be housed within a device configured to be coupled to a storage slot, for example, as if the device were a storage drive. For example, in some embodiments, the one or more offload processors may be housed within a device that includes an interface in conformance with a version of the NVM Express® specification developed by NVM Express, Inc, as described at https://nvmexpress.org, (hereinafter referred to as the "NVMe specification"). Further, the device itself may have a form factor in accordance with the U.2 specification (formerly known as SFF-8639), developed and published by the SSD Form Factor Work Group, as described at http://www.ssdformfactor.org/docs/SSD_Form_Factor_Version1_00.pdf.

Offload processing devices may be communicatively coupled to one or more primary processors by a switching fabric or other interconnectivity medium that is disposed between the one or more primary processors and the storage slot to which the offload processing device is connected, for example, such that multiple (e.g., any) of the one or more primary processors can utilize it. For example, the offload processor may be coupled to one or more directors of a storage system, e.g., back-end drivers or adapters (BEs) of the storage system, across the switch fabric. The offload processor device may be configured to communicate with a primary processor or other device component over the fabric or other interconnectivity medium using any of a variety of interconnect technologies such as, for example, Fibre Channel (FC), InfiniBand (IB), PCIe (e.g., in accordance with NVMe) or other interconnect technologies. In some embodiments, the offload processor may be configured to serve as one side of a PCIe non-transparent bridge (NTB), which is a point-to-point PCIe bus connecting two systems, providing electrical isolation between the two systems, where each side (system) of the bridge has its own independent address domain.

The primary processors may send tasks ranging from simple to complex to the one or more offload processors and/or may share the processing duties for a given task. In some embodiments, a primary processor or other component of a system may send data and instructions to an offload processor, and the offload processor may execute the instructions on the data. For example, the data may be an entire database of data and the instructions part of an application to be run on the data, for example, a computationally intense application like a machine learning application. In some embodiments, after receiving the instructions and data, the offload processor may execute the instructions, is some cases an entire application, without assistance from, or communication with, a primary processor or any other components of the system, produce results and communicate only the results back to the primary processor and/or other components.

Offloading processing to a storage slot-connected processor may conserve compute resources of the primary processor and other resources of a device, including communication/network resources, which can be further conserved by having the offload processor perform tasks entirely on its own and only report back results, particularly in cases in which the task is complex and/or large, for example, when the task is performance of an application in its entirety. Further, by not directly connecting and/or dedicating an offload processor to a processor, but rather by making the offload processor available to multiple primary processors, for example, in a storage slot coupled to the multiple processors by a switch fabric, compute resources can be more optimally managed and balanced across primary processor, and individual offload processors are not susceptible to failure of a single primary processor to which it is dedicated and/or directly coupled.

Offloading processing to storage slot-connected processors allows for improved scaling of processing power of a storage system, server or other device compared to devices using offload processors directly connected to specific primary processors. The extent of such processing power may be based in part by the number of storage slots available, and the processing capacity that can accommodated within the offload processing devices configured to couple to the storage slots, which is likely a greater cumulative processing power than could be achieved with offload processor directly connected to primary processors.

Illustrative embodiments of the invention will now be described in more detail in relation to the figures.

Referring now to FIG. 1, shown is an example of an embodiment of a system 10 according to some embodiments of the invention. The system 10 includes a data storage system 12 connected to host systems 14*a*-14*n* through communication medium 18. In this embodiment of the system 10, the N hosts 14*a*-14*n* may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14*a*-14*n* may access and communicate with the data storage system 12, and also may communicate with others included in the system 10.

Each of the host systems 14*a*-14*n* and the data storage system 12 included in the system 10 may be connected to the communication medium 18 by any one of a variety of connections as may be provided and supported in accordance with the type of communication medium 18. The processors included in the host computer systems 14*a*-14*n* may be any one of a variety of proprietary or commercially available single or multi-processor system, such as an Intel-based processor, or other type of commercially available processor able to support traffic in accordance with each particular embodiment and application.

It should be appreciated that the particulars of the hardware and software included in each of the components that may be included in the data storage system 12 are described herein in more detail, and may vary with each particular embodiment. Each of the host computers 14*a*-14*n* and data storage system may all be located at the same physical site, or, alternatively, also may be located in different physical locations. Communication media that may be used to provide the different types of connections between the host computer systems and the data storage system of the system 10 may use a variety of different communication protocols such as, for example, SCSI, ESCON, Fibre Channel, iSCSI, FCoE, GIGE (Gigabit Ethernet), NVMeoF (NVMe over Fabric) and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14*a*-14*n* may issue a data request to the data storage system 12 to perform a data operation. For example, an application executing on one of the host computers 14*a*-14*n* may perform a read or write operation resulting in one or more data requests to the data storage system 12.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example, as described in more detail in following paragraphs, reference is made to the more detailed view of element 20a. It should be noted that a similar more detailed description also may apply to any one or more of the other elements, such as 20n, but have been omitted for simplicity of explanation. It should also be noted that an embodiment may include data storage systems from one or more vendors. Each of 20a-20n may be a data storage system 12 included in an embodiment of the system 10 of FIG. 1 to provide storage services to, for example, host computer systems.

Each of the data storage systems, such as 20a, may include a plurality of data storage devices (e.g., physical non-volatile storage devices), such as disk devices or volumes, for example, in an arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. System 20a also may include a fabric that enables any of disk adapters 23a-23n to access any of disks or volumes 24-24N, in which one or more technologies and/or protocols (e.g., NVMe or NVMe-oF) may be employed to communicate and transfer data between the DAs and the disks or volumes, for example, as described below in more detail in relation to FIG. 3. The system 20a also may include one or more host adapters ("HAs") or directors 21a-21n. Each of these HAs may be used to manage communications and data operations between one or more host systems and the global memory. In an embodiment, the HA may be a Fibre Channel Adapter or other type of adapter which facilitates host communication.

Also shown in the storage system 20a is an RA or remote adapter 40. The RA may be hardware including a processor used to facilitate communication between data storage systems, such as between two of the same or different types of data storage systems.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting data storage devices may be any suitable storage device such as a rotating disk drive, flash-based storage, and the like. The particular data storage system as described in this embodiment, or a particular device thereof, such as a rotating disk or solid-state storage device (SSD; e.g., a flash-based storage device), should not be construed as a limitation. Other types of commercially available data storage systems, as well as processors and hardware controlling access to these particular devices, also may be included in an embodiment.

In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as by a DA.

Host systems provide data and access control information through channels to the storage systems, and the storage systems also may provide data to the host systems also through the channels. The host systems do not address the disk drives of the storage systems directly, but rather access to data may be provided to one or more host systems from what the host systems view as a plurality of LUNs. The LUNs may or may not correspond to the actual disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

Figure 2B:
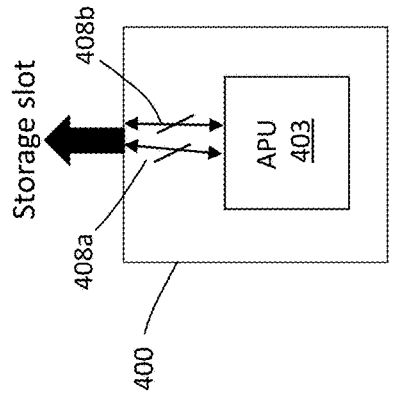
FIG. 2B is a block diagram illustrating an example of logical internal communications between directors and memory of the data storage system of FIG. 2A according to embodiments of the invention.

Referring to FIG. 2B, shown is a representation of the logical internal communications between the directors and memory included in a data storage system according to some embodiments of the invention. Included in FIG. 2B is a plurality of directors 37a-37n coupled to the memory 26. Each of the directors 37a-37n represents one of the HAs, RAs, or DAs that may be included in a data storage system. In an embodiment disclosed herein, there may be up to sixteen directors coupled to the memory 26. Other embodiments may use a higher or lower maximum number of directors that may vary. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host also may have one or more additional mapping layers so that, for example, a host side logical device or volume is mapped to one or more data storage system logical devices as presented to the host.

Storage system 12 or one or more components thereof described in relation to FIGS. 1-2B may be implemented using one or more Symmetrix®, VMAX® or VMAX3® systems (hereinafter referred to generally as VMAX storage systems) made available from Dell EMC.

Figure 3:
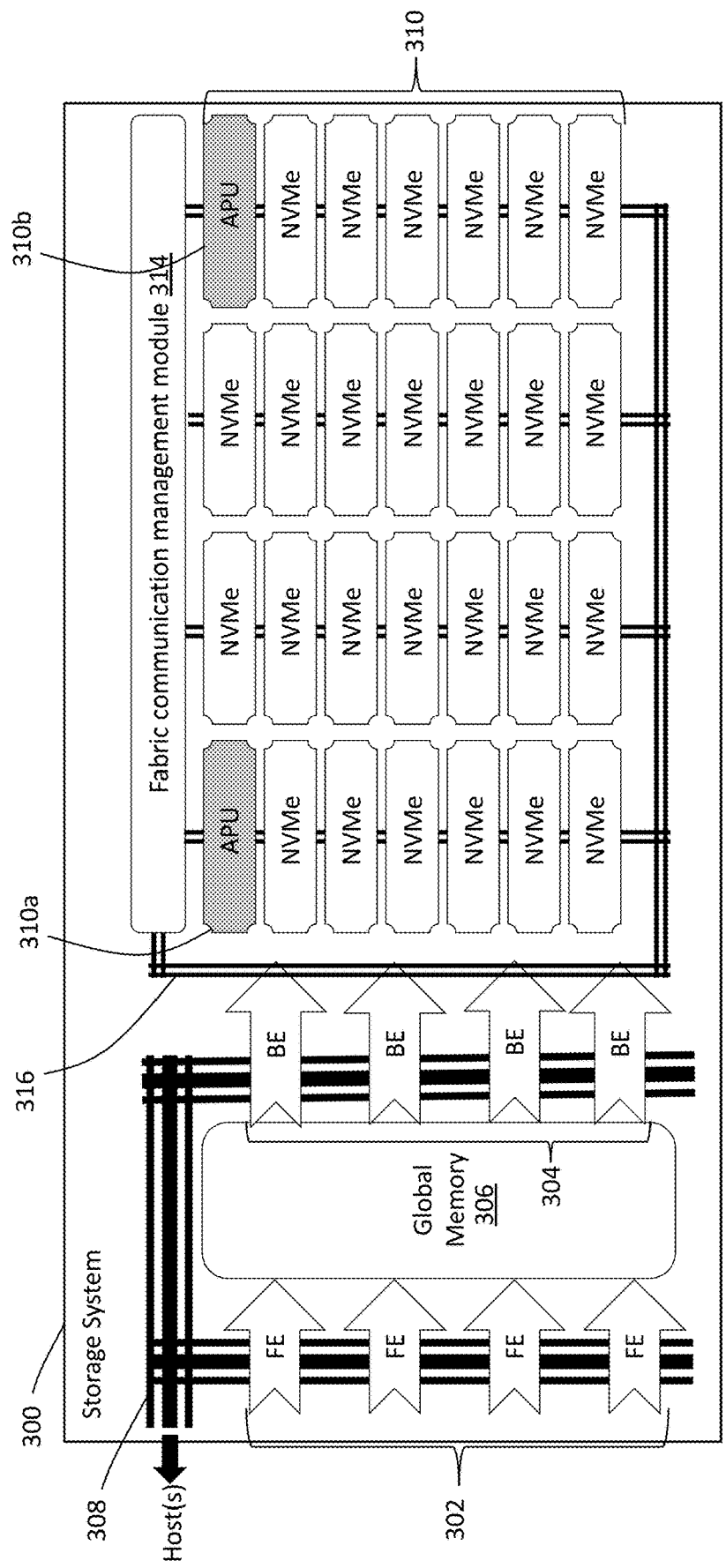
FIG. 3 is a block diagram illustrating an example of a storage system having offload processors including APUs according to embodiments of the invention.

FIG. 3 is a block diagram illustrating an example of a storage system 300 having offload processors according to embodiments of the invention. Other embodiments of a storage system having offload processors, for example, variations of storage system 300, are possible and are intended to fall within the scope of the invention. The storage system 300 may be implemented using one or more components of the system 10, for example, one or more storage systems 12 or a variation thereof. It should be appreciated that, while FIG. 3 illustrates a storage system configured to perform offload processing in accordance with embodiments of the invention, the invention is not so limited, as other devices, such as, for example, a Dell PowerEdge™ server made available from Dell EMC, may similarly be configured to implement one or more of the aspects of the system described in relation to FIG. 3.

Storage system 300 may include any of: front-end adapters (FEs) 302, back-end adapters (BEs) 304, switching fabric 308, global memory 306, storage slots 310, switching fabric 316, fabric communication management module 314, other components or any suitable combination of the foregoing. Each of the FEs 302 may be included within a director 37a-37n and/or host adapter 21a-21n, and may process I/O communications between the storage system 300 and one or more hosts over the switch fabric 308, for example, in accordance with one or more interconnectivity technologies like InfiniBand (IB). Other interconnectivity technologies may be used for such I/O communications. Each of the BEs 304 may be included within a director 37a-37n and/or disk adapter 23a-23n. Each of BEs 304 may process I/O communications between the storage system 300 and storage drives connected to any of slots 310 over fabric 316, for example, in accordance with any of a variety of interconnectivity technologies including, for example, one or more PCIe or NVMe technologies. Each of the BEs 304 also may be connected to, and communicate over, the switch fabric 308.

In some embodiments of the invention, each of the storage slots 310 may be configured to communicatively couple BEs 304 and storage drives occupying the storage slots 310 in accordance with one or more technologies, for example, an NVMe technology. Fabric communication management module 314 (e.g., an NVMe management module) may be configured to assist in the management of communications across the fabric 316. It should be appreciated that other technologies may be used. Further, while twenty-eight (28) storage slots are illustrated, it should be appreciated that any viable number of storage slots may be included. In the illustrative embodiment of FIG. 3, two of the storage slots 310a and 310b are occupied with two offload processing devices that each include at least one APU, but it should be appreciated that other types of processors may be included in each offload processing device, e.g., one or more CPUs and/or GPUs, and the number of coupled offload processors may be different than the two (2) illustrated. Further, in some embodiments, different types of offload processors (e.g., CPUs, GPUs, APUs, other types of processors, or any suitable variation or combination of the foregoing) may be present and operating concurrently in different storage slots 310.

A high-level programming difference between CPUs and GPUs is that GPUs typically are optimized for data-parallel workloads, while CPUs cores typically are optimized for executing a single stream of instructions as quickly as possible. A GPU may be characterized as a SIMD (single instruction stream-multiple data stream) device optimized for executing the same instruction stream in parallel. Generally, a single GPU includes multiple cores where all cores may execute the same instruction stream simultaneously/in parallel and where each of the different cores or instruction stream execution instances may operate on different data. Thus, for example, a GPU including 32 cores may perform parallel processing of the same code or instruction stream, where each of the 32 cores execute the same instruction stream on a different data set (e.g., different data inputs and outputs).

In some embodiments of the invention, for processing steps which are computationally intensive and amenable for parallelization, a GPU or an APU (which includes one or more GPUs and one or more CPUs) on an offload processing device may be selected to perform the processing steps, while other processing is performed serially using a CPU, for example, a CPU of a primary processor. Similarly, a APU may include logic (embodied as hardware, firmware, software or a combination thereof) that, for functions, tasks, applications and the like that have been assigned/offloaded to the APU (e.g., by a primary processor), selects one or more of its GPUs to perform processing steps which are relatively computationally intensive and amenable for parallelization and selects one or more of its CPUs to perform other processing serially. It should be appreciated that processing described herein as being performed by an APU or GPU may also be performed by other hardware component (s) providing similar functionality to that of an APU or GPU.

Code that executes in a GPU may be programmed, for example, using the CUDA programming language designed to exploit parallel processing characteristics of the GPU. The CUDA architecture consists of hundreds of processor cores that operate together to process application data. An application having code executed by GPUs in accordance with the CUDA architecture may include code that performs parallel processing. The GPU can handle thousands of concurrent programming threads, each running one element of a parallel computation. To facilitate parallel programming, CUDA organizes these threads in blocks, and the threads blocks are organized in a grid. The threads in a thread block can be indexed in one, two, or three dimensions, and the grid can be indexed in one or two dimensions. In some embodiments, function calls that run in the GPU are called "kernels", and may be launched from, or initiated by a CPU, for example, a CPU of a primary processor. Each kernel corresponds to a portion of parallel code that may be executed by multiple threads, where such threads are organized into a number of blocks. A "grid" of blocks may be run as a unit of computation on the GPU where all threads in the grid may execute concurrently and each such thread may operate on different data (e.g., each thread executing in parallel executes the same instruction stream but each thread may execute using different input data and generating different output data independent of the other concurrently executing threads of the same grid). A GPU device may have different types of memory forming a memory hierarchy each with different size, speed, and usage.

In some embodiments herein, a data flow between the CPU of a primary processor and a APU or GPU of an offload processing device may include the CPU copying data to memory of the APU or GPU. Instructions such as those included in the kernel also may be copied to memory of the APU or GPU. The APU or GPU then may asynchronously execute code of the kernel (e.g., multiple threads concurrently execute the same portion of code corresponding to the kernel with each concurrent thread operating on different data). When the CPU executes code that makes a call to copy data from APU or GPU memory back to computer memory, the call may block until all threads have completed processing and the output data is available. At this point, the results, such as the output data, may be transmitted from the APU or GPU to the CPU.

An application developer may modify an application including code which performs steps sequentially to perform appropriate portions in parallel on cores of one or more APUs or GPUs, for example, of an offload processor, with remaining portions of the application being executed by a CPU, for example of a primary processor. Mapping a function to an APU or GPU may include rewriting the function to expose the parallelism in the function and adding code to move data to and from the APU or GPU. In at least one embodiment in accordance with techniques herein, the developer may be tasked with launching many threads simultaneously and the APU or GPU hardware manages the threads and does thread scheduling.

In some embodiments of the system described herein, one or more APUs in components made available by Advanced Micro Devices based in Santa Clara, Calif. (hereinafter "AMD") may be used, such as an AMD V1000 processor, which includes multiple (e.g., 4) "Zen" CPU cores, multiple (e.g., 11) GPU compute units (e.g., in accordance with "Vega" GPU architectures) and 4-8 GB or memory. Further, the AMD V1000 may operate at 15 Watts and be configured to communicate with connected devices at Gen3 PCI speeds. The V1000 APU may be optimized to execute TensorFlow applications, such that applications that have machine-learning and/or predicative-modeling capabilities may be written using the TensorFlow framework and executed using the V1000 APU.

In some embodiments of the system described herein, one or more GPUs in components made available by Nvidia Corporation based in Santa Clara, Calif. (hereinafter "Nvidia") may be used, such as GPUs in the Tegra TX2™, based on NVIDIA's massively parallel CUDA architecture, to perform offload processing.

Figure 4:
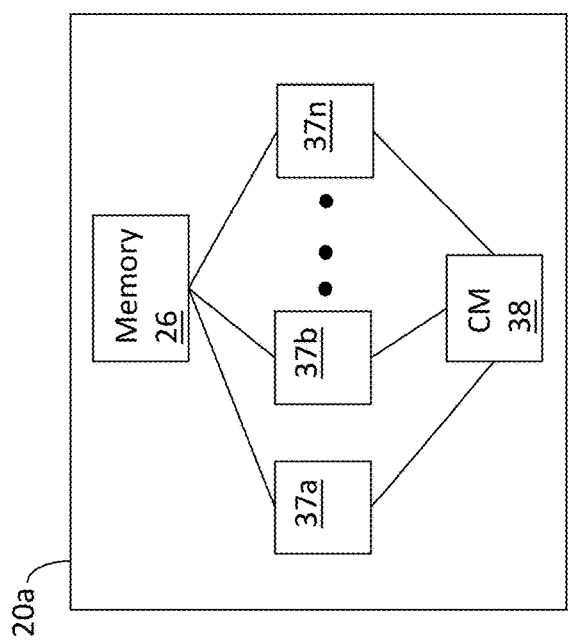
FIG. 4 is a block diagram of an offload processing device including an APU according to embodiments of the invention.

Returning to FIG. 3, each of the offload processing devices in slots 310a and 310b may be implemented as an offload processing device 400 described in relation to FIG. 4. FIG. 4 is a block diagram of an offload processing device 400 according to embodiments of the invention. Other embodiments of an offload processing device, for example, variations of device 400, are possible and are intended to fall within the scope of the invention.

Offload processing device 400 may include any of: one or more APUs 403 (e.g., an AMD V1000 chip); one or more interconnects 408a and 408b; other components or any suitable combination of the foregoing. The APU 403 may include an internal PCIe switch (not shown) to connect to the interconnects 408a and 408b. Each of interconnects 408a and 408b may be configured to conform to one or more interconnect technologies, for example, one or more PCIe technologies. Each of interconnects 408a and 408b may be 2-lane gen3 interconnects capable of transmission speeds of 8 GT/second (~2 GB/second for a Gen3 x2). Other PCIe technologies and other interconnect technologies may be used.

In some embodiments, storage slots of a device, e.g., one or more of the storage slots 310 may be configured to impose certain power consumption limits on storage devices to be inserted therein, which may be desirable to produce a certain power consumption profile. For example, in some embodiments of the invention, a storage slot may be configured to allow a storage drive to consume not more than 25 watts. In such embodiments, an offload processing device, for example, the offload processing device 400, may be configured to consume an amount of power equal to or less than the power consumption limit, e.g., 25 watts, of the storage slot. Thus, in embodiments of the invention, the offload storage device not only meets certain form factor requirements (e.g., U.2), and technology requirements (e.g., PCIe and/or NVMe), but also power consumption restraints. For example, in an embodiment in which a storage slot has a power consumption limit of 25 W, an APU including a 15-watt AMD V1000 chip and PCIe switch collectively consuming just under 20 watts may be used.

In some embodiments, the offload processor device may include a carrier card (not shown) on which each of the components 403, 408a and 408b, and other components may be disposed. Such a carrier card may have connectors to connect one or more APUs to interconnects, for example, in accordance with PCIe technology, and the output of the offload device 400 to a storage slot, for example, in accordance with NVMe technology. Such a card may be configured to enable the necessary components to be disposed thereon within the offload processing device while still meeting other requirements, for example, conforming with U.2, interconnect technologies and power consumption thresholds. In some embodiments, the properties (e.g., physical and logical parameters) of the carrier card may be standardized and the specifications shared with component (e.g., APU, switch) manufacturers so that, as these components evolve, they can be designed to conform with the carrier card specifications, which may result in several U.2-compliant offload processor device options being available.

Figure 5:
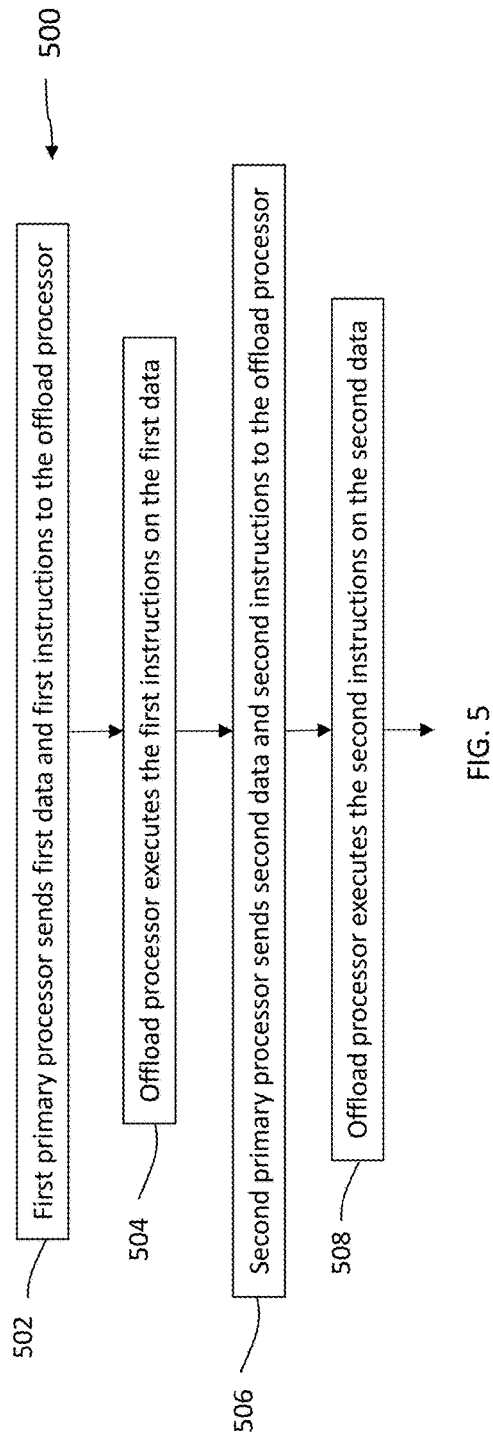
FIG. 5 is a block diagram illustrating an example of a method of offloading processing according to embodiments of the invention.

FIG. 5 is a block diagram illustrating an example of a method 500 of offloading processing according to embodiments of the invention. Other embodiments of a method of offloading processing, for example, variations of method 500, are possible and are intended to fall within the scope of the invention. Method 500 may be implemented on a device (e.g., the storage system 300) having a plurality of primary processors (e.g., corresponding to BEs 304) connected to one or more storage slots (e.g., NVMe-enabled storage slots 310) across a switch fabric (e.g., a PCIe fabric 316).

In a step 502, a first primary processor (e.g., corresponding to one of BEs 304) may send first data and first instructions to an offload processor, for example, on an offload processing device 400 occupying a storage slot 310, and the offload processor may execute the first instructions on the first data in a step 504. For example, the instructions may be part of application, and the entire application may be sent for execution on the offload processor. In a step 506, a second primary processor (e.g., corresponding to a different one of the BEs 304) may send second data and second instructions to the offload processor, and the offload processor may execute the second instructions on the second data in a step 508. The method 500 also may include steps of reporting results of executing the instructions back to the primary processor (or other component) that sent the data and instructions. The data flow between the primary processor and the offload processor may be as described in more detail elsewhere herein.

In some embodiments, if the first or second primary processor fails, the offload processor may continue executing instructions previously sent to it by the failed primary processor, and the offload processor and any other offload processors not being currently utilized by the failed primary processor may remain available to one or more (e.g., all) of the remaining primary processors that have not failed.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including method 500 or parts thereof, may be implemented using one or more of the systems described in relation to FIGS. 1-4 or components thereof. Further, various aspects of the invention may be implemented using software, hardware, a combination of software and hardware and/or other computer-implemented modules or devices having the described features and performing the described functions.

Software implementations of embodiments of the invention may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. Embodiments of the invention may be used in connection with any appropriate OS.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A system comprising:
   one or more primary processors;
   one or more storage slots arranged to receive storage drives;
   a switch fabric communicatively coupling the one or more storage slots to the one or more primary processors to perform I/O operations between the one or more primary processors and one or more storage drives installed in the one or more storage slots;
   a processing device including an accelerated processing unit, the processing device disposed with the one or more storage slots, the accelerated processing unit communicatively coupled to the one or more primary processors; and
   a memory comprising code stored thereon that, when executed, performs a method comprising:
      a first primary processor of the one or more primary processors sending first data and one or more first instructions over the switch fabric to the accelerated processing unit, and
      the accelerated processing unit executing the one or more first instructions on the first data,
   wherein the one or more first instructions define an application, and wherein the accelerated processing unit executes the application to produce results without assistance from the first processor and communicates the results to the first processor.

2. The system of claim 1, wherein the accelerated processing unit includes:
   at least one central processing unit;
   at least one graphical processing unit; and
   logic to determine utilization of the at least one central processing unit and/or the at least one graphical processing unit based at least in part on a processing task to be performed.

3. The system of claim 1, wherein the one or more primary processors includes a plurality of primary processors communicatively coupled to the accelerated processing unit.

4. The system of claim 1, wherein the processing device has a form factor in conformance with a U.2 specification.

5. The system of claim 1, wherein the processing device has an interface that interfaces the accelerated processing unit with the switch fabric in accordance with an NVMe specification.

6. The system of claim 1, wherein the method further comprises:
   a second primary processor of the one or more primary processors sending second data and one or more second instructions over the switch fabric to the accelerated processing unit; and
   the accelerated processing unit executing the one or more second instructions on the second data.

7. The system of claim 1, wherein during execution of the one or more first instructions, the first primary processor fails, and
   wherein the accelerated processing unit continues executing the one or more first instructions during the failure of the first primary processor.

8. The system of claim 1, wherein the system is a data storage system including one or more directors that include the one or more primary processors and one or more back-end adapters communicatively coupling the one or more directors to the accelerated processing unit across the switch fabric.

9. For a system comprising a plurality of primary processors, an accelerated processing unit physically coupled to the system by a non-volatile storage slot of the system, and a switch fabric communicatively coupling the non-volatile storage slot to each of the plurality of primary processors, a method comprising:
   a first processor of the plurality of primary processors sending first data and one or more first instructions over the switch fabric to the accelerated processing unit; and
   the accelerated processing unit executing the one or more first instructions on the first data, wherein the one or more first instructions define an application, and wherein the accelerated processing unit executes the application to produce results without assistance from the first primary processor and communicates the results to the first primary processor.

10. The method of claim 9, further comprising:
a second processor of the plurality of primary processors sending second data and one or more second instructions over the switch fabric to the accelerated processing unit; and
the accelerated processing unit executing the one or more second instructions on the second data.

11. The method of claim 9, wherein during execution of the one or more first instructions, the first processor fails, and
wherein the accelerated processing unit continues executing the one or more first instructions during the failure of the first processor.

12. The method of claim 9, wherein the accelerated processing unit includes at least one central processing unit and at least one graphical processing unit, and wherein the method further comprises:
determining utilization of the at least one central processing unit and/or the at least one graphical processing unit based at least in part on a processing task to be performed.

13. The method of claim 9, wherein the accelerated processing unit is part of a processing device having a form factor in conformance with a U.2 specification.

14. The method of claim 9, wherein the accelerated processing unit is part of a processing device having an interface that interfaces the accelerated processing unit with the switch fabric in accordance with an NVMe specification.

* * * * *